（12）United States Patent
Baxter et al.

(10) Patent No.: US 12,344,386 B2
(45) Date of Patent: Jul. 1, 2025

(54) CIRCULAR CONFIGURATION OF BATTERY CELLS FOR AIRCRAFT

(71) Applicants: Rolls-Royce Corporation, Indianapolis, IN (US); Rolls-Royce North American Technologies, Inc., Indianapolis, IN (US)

(72) Inventors: Riggs Baxter, Indianapolis, IN (US); Peter Laux, Indianapolis, IN (US); Mathew Hill, Indianapolis, IN (US); John Timothy Alt, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 851 days.

(21) Appl. No.: 17/456,501

(22) Filed: Nov. 24, 2021

(65) Prior Publication Data

US 2023/0159174 A1 May 25, 2023

(51) Int. Cl.
*H02J 7/00* (2006.01)
*B64D 27/24* (2006.01)
*H01M 10/613* (2014.01)
*H01M 10/625* (2014.01)
*H01M 10/643* (2014.01)
*H01M 10/653* (2014.01)
*H01M 50/213* (2021.01)
*H01M 50/249* (2021.01)
*H01M 50/509* (2021.01)

(52) U.S. Cl.
CPC .......... *B64D 27/24* (2013.01); *H01M 10/613* (2015.04); *H01M 10/625* (2015.04); *H01M 10/643* (2015.04); *H01M 10/653* (2015.04); *H01M 50/213* (2021.01); *H01M 50/249* (2021.01); *H01M 50/509* (2021.01); *H02J 7/0013* (2013.01); *B64D 2221/00* (2013.01)

(58) Field of Classification Search
CPC ............ H01M 10/613; H01M 10/625; H01M 10/643; H01M 10/653; H01M 50/249; H01M 50/509; H01M 50/213; H02J 7/00; H02J 7/0013; B64D 27/24
See application file for complete search history.

(56) References Cited

U.S. PATENT DOCUMENTS

| 2019/0006699 A1* | 1/2019 | Jones ................ H01M 10/6563 |
| 2021/0078714 A1* | 3/2021 | Demont ................ H01M 50/35 |

FOREIGN PATENT DOCUMENTS

| DE | 102018123707 A1 * | 3/2020 | ........ H01M 10/6552 |

OTHER PUBLICATIONS

Kucinski, "Rolls-Royce's race to develop the world's fastest all-electric aircraft" SAE International, Jan. 8, 2019, 3 pgs.

* cited by examiner

*Primary Examiner* — Karie O'Neill Apicella
(74) *Attorney, Agent, or Firm* — Shumaker & Sieffert, P.A.

(57) ABSTRACT

An example system includes one or more battery modules, a battery module of the one or more battery modules comprising: a cylindrical pressure vessel; a cooling channel extending axially through the cylindrical pressure vessel; and one or more battery packs within the cylindrical pressure vessel, a battery pack of the one or more battery packs comprising a plurality of battery cells radially distributed about the cooling channel.

19 Claims, 7 Drawing Sheets

CIRCULAR CONFIGURATION OF BATTERY CELLS FOR AIRCRAFT

TECHNICAL FIELD

This disclosure relates to configurations for battery cells for electric or hybrid-electric aircraft propulsion systems.

BACKGROUND

Aircraft may be powered by various propulsors (e.g., wheels, fans, or propellers), which may be driven by various motors. For instance, in electric aircraft, an electric motor may drive the propulsors using electrical energy sourced from an electrical energy storage system (ESS) that includes one or more batteries.

SUMMARY

In general, this disclosure describes circular configurations of battery cells in an aircraft ESS. Most developments for ESS technology have been with respect to individual cell or pouch designs, while packaging of those cells for larger vehicles are largely overlooked. In particular, most packaging designs are based on automotive applications (e.g., where the ESS forms a portion of a floor of the automobile and is flat). However, designs based on automotive application may not consider specific aerospace requirements (e.g., Freight Shipping: UN38.8 requirements, Transport of Dangerous Goods: DO-160G standards, and DO-311 standards).

In accordance with one or more aspects of this disclosure, an ESS in an aircraft may include battery cells in a circular configuration. For instance, the ESS may include one or more battery modules that each include a centralized cooling channel and battery pack that includes a plurality of battery cells radially distributed above the centralized cooling channel. The plurality of battery calls may be located within a cylindrical pressure vessel, which may be configured to provide explosion containment (e.g., in compliance with DO-311). A single battery module may include a plurality of battery packs that each include a plurality of battery calls. The plurality of battery packs may be placed end-to-end such that a single cooling channel may pass through each of the plurality of battery packs of the battery module.

Several battery modules may be connected together to form the ESS. The battery modules may be arranged in a two-dimensional configuration. For instance, 12 battery modules may be arranged in a four wide by three tall configuration. By arranging the battery modules in the two-dimension configuration, this disclosure may enable battery modules to better fit within aircraft. For instance, the two-dimensional configuration may enable an ESS to be positioned within a wing of an aircraft.

As one example, a system includes one or more battery modules, a battery module of the one or more battery modules comprising: a cylindrical pressure vessel; a cooling channel extending axially through the cylindrical pressure vessel; and one or more battery packs within the cylindrical pressure vessel, a battery pack of the one or more battery packs comprising a plurality of battery cells radially distributed about the cooling channel.

As another example, an aircraft includes a wing; one or more battery modules positioned in the wing, a battery module of the one or more battery modules comprising: a cylindrical pressure vessel; a cooling channel extending axially through the cylindrical pressure vessel; and one or more battery packs within the cylindrical pressure vessel, a battery pack of the one or more battery packs comprising a plurality of battery cells radially distributed about the cooling channel; and an electric motor coupled to a propulsor configured to propel the aircraft using electrical energy sourced from the one or more battery modules.

The details of one or more examples are set forth in the accompanying drawings and the description below. Other features, objects, and advantages will be apparent from the description and drawings, and from the claims.

DETAILED DESCRIPTION

Figure 1:
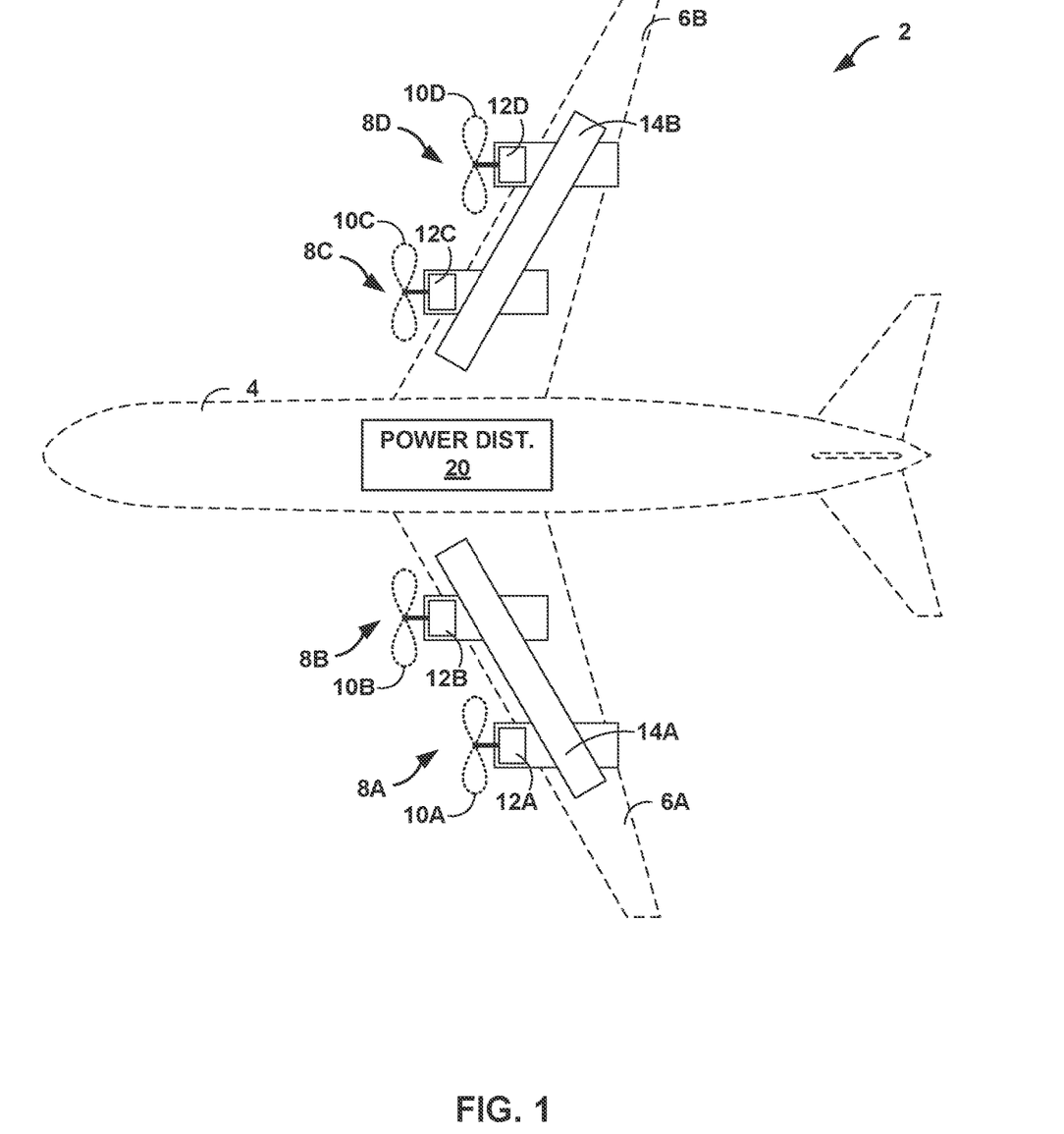
FIG. 1 is a conceptual block diagram illustrating an aircraft that includes an electrical propulsion system, in accordance with one or more aspects of this disclosure.

FIG. 1 is a conceptual block diagram illustrating an aircraft that includes an electrical propulsion system, in accordance with one or more aspects of this disclosure. As shown in FIG. 1, aircraft 2 includes fuselage 4, port wing 6A, starboard wing 6B, nacelles 8A-8D (collectively, "nacelles 8"), and electrical energy storage systems (ESSs) 14A and 14B. Examples of aircraft 2 include, but are not limited to, fixed wing airplanes, tilt rotor aircraft, rotorcraft (e.g., helicopters, quadcopters, etc.), or any other flying machine propelled at least in part using electrically driven propulsors. Fuselage 4 may be a main body of aircraft 2 in which passengers and/or cargo are stored.

Nacelles 8 may include various components to support operation of aircraft 2. Nacelles 8 may be distributed on both port and starboard sides of aircraft 2. For instance, as shown in FIG. 1, nacelles 8A and 8B may be positioned on a port side of aircraft 2 (e.g., attached to port wing 6A) and nacelles 8C and 8D may be positioned on a starboard side of aircraft 2 (e.g., attached to starboard wing 6B). Nacelles 8 may be referred to by relative position. For instance, nacelles 8B and 8C may be referred to as inboard nacelles (e.g., as they are located closer to fuselage 4 than nacelles 8A and 8D). Similarly, nacelles 8A and 8D may be referred to as outboard nacelles (e.g., as they are located farther from fuselage 4 than nacelles 8B and 8C).

One or more of nacelles 8 may include propulsors configured to propel aircraft 2. For instance, as shown in FIG. 1, each of nacelles 8 may include a respective propulsor of propulsors 10A-10D (collectively, "propulsors 10") that is driven by a respective electric motor of electric motors 12A-12D (collectively, "electric motors 12"). Examples of propulsors 10 include, but are not limited to, fans, propellers (e.g., either fixed or variable pitch), and the like. Examples of electric motors 12 include, but are not limited to, brushed, brushless, alternating current (AC), direct current (DC), field-wound, permanent magnet, etc. Electric motors 12 may provide rotational energy to propulsors 10 using electrical energy source from one or more components of aircraft 2, such as ESS 14A or ESS 14B.

Aircraft 2 may include a plurality of electrical energy storage systems, such as ESS 14A and ESS 14B (collectively, "ESSs 14"). The ESSs 14 may be configured to store electrical energy for use by one or more components of aircraft 2, such as electric motors 12. Each of ESSs 14 may be connected to a respective electrical bus of a plurality of electrical busses. For instance, ESS 14A may be connected to, and configured to supply electrical energy to, a first electrical bus. Similarly, ESS 14B may be connected to, and configured to supply electrical energy to, a second electrical bus.

In accordance with one or more aspects of this disclosure, each of ESS 14s may include battery cells in a circular arrangement. For instance, each of ESSs 14 may include one or more battery modules. As discussed in further detail below, each of the battery modules may include a cylindrical pressure vessel; a cooling channel extending axially through the cylindrical pressure vessel; and one or more battery packs within the cylindrical pressure vessel. The battery packs may each include a plurality of battery cells radially distributed about the cooling channel.

As shown in FIG. 1 and discussed in further detail below, ESSs 14 may be located in wings of aircraft 2. For instance, ESS 14A may be located in wing 6A and ESS 14B may be located in wing 6B. As shown in the example of FIG. 9, battery modules of ESSs 14 may be located in a forward quarter chord of the wing. In other examples, ESSs 14 may be located in pods or nacelles attached to the wings of aircraft 2.

Aircraft 2 may include protection and distribution components 20 ("PnD 20") that form portions of the electrical busses. PnD 20 may include various distribution panels and electrical cables that facilitate the transfer of electrical energy between components of aircraft 2 (e.g., electric motors 12 and ESSs 14). As one example, PnD 20 may include a first distribution panel for the first electrical bus and a second distribution panel for the second electrical bus. The first and second distribution panels may be located in fuselage 4. As another example, PnD 20 may include several electrical cables. For instance, PnD 20 may include electrical cables connecting ESSs 14 to the distribution panels, and electrical cables connecting the distribution panels to electric motors 12. As such, in some examples, all of the electrical energy provided by ESSs 14 and utilized by electric motors 12 may flow through the distribution panels.

Figure 2:
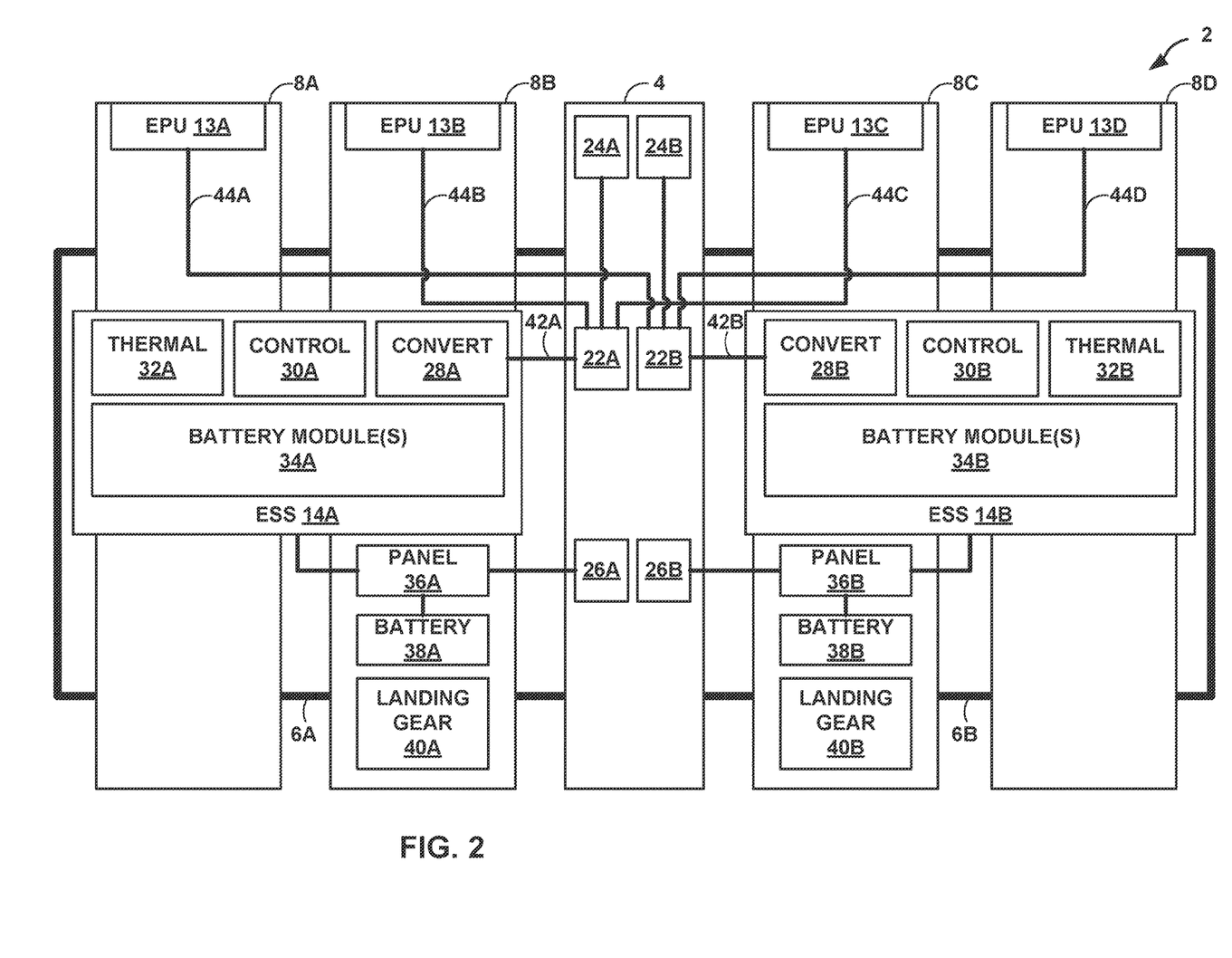
FIG. 2 is a system diagram illustrating further details of one example of aircraft 2 of FIG. 1, in accordance with one or more aspects of this disclosure.

FIG. 2 is a system diagram illustrating further details of one example of aircraft 2 of FIG. 1, in accordance with one or more aspects of this disclosure. As shown in FIG. 2, each of nacelles 8 may include an electric propulsion unit (EPU) of EPUs 13A-13D (collectively, "EPUs 13"). Each of EPUs 13 may include components configured to propel aircraft 2 using electrical energy. For instance, each of EPUs 13 may include an electric motor and a propulsor (e.g., an electric motor of electric motors 12 and a propulsor of propulsors 10 of FIG. 1). In some examples, EPUs 13 may include additional components. For instance, where the electrical busses supplying EPUs 13 are direct current (DC) electrical busses and the electric motors are alternating current (AC) motors, EPUs 13 may each include an inverter configured to convert DC electrical energy into AC electrical energy.

ESSs 14, as shown in FIG. 2, may each include a respective converter of converters 28A and 28B (collectively, "converters 28"), a respective controller of controllers 30A and 30B (collectively, "controllers 30"), a respective thermal management system (TMS) of TMS 32A and 32B (collectively, "TMSs 32"), and a respective battery module of battery modules 34A and 34B (collectively, "battery modules 34").

Converters 28 include components configured to convert electrical energy exchanged between battery modules 34 and electrical busses. For instance, converter 28A may convert electrical energy between battery module 34A and a first electrical bus and converter 28B may convert electrical energy between battery module 34B and a second electrical bus. In some examples, to convert the electrical energy, converters 28 may adjust a voltage of the electrical energy. For instance, where the first electrical bus is a DC electrical bus (e.g., a 1080 volt DC electrical bus), converter 28A may include DC/DC converters configured to convert electrical energy between a voltage of battery module 34A and a voltage of the first electrical bus. Converters 28 may be bi-directional in that converters 28 may convert electrical energy provided by battery modules 34 for use by other components of aircraft 2 and convert electrical energy provided by other components of aircraft 2 for use in charging battery modules 34.

Controllers 30 may be configured to control operation of ESSs 14. For instance, controller 30A may be considered a controller of a battery management system that controls operation of converter 28A, TMS 32A, and battery module 34A.

TMSs 32 may include components configured to manage a thermal state of ESSs 14. For instance, each of TMSs 32 may include loops (e.g., heating and/or cooling) configured to manage a temperature of a corresponding ESS of ESSs 14. As one example, TMS 32A may include one or more temperature sensors configured to monitor a temperature of battery module 34A, one or more pumps configured to pump coolant through battery module 34A, one or more heaters configured to heat the coolant, and a controller that manages operation of the pumps and heaters based on the temperature of battery module 34A. TMS 32B may include similar components for battery module 34B.

Battery modules 34 may each include a plurality of battery modules that store electrical energy to be used for propulsion of aircraft 2. The battery cells in battery modules 34 may be any type of battery. Examples of battery cells include, but are not limited to, lithium-ion, lead-acid, nickel-cadmium, nickel-metal hydride, lithium-ion polymer, or any other type of rechargeable battery (i.e., secondary cell).

Wings 6 may include one or more components configured to facilitate operation of battery modules 34. As one example, wings 6 may each include vents configured to transmit gasses or other particulate (e.g., smoke) from battery modules 34 to outside of aircraft 2. As another example, wings 6 may each include access panels that enable direct access to battery modules 34 from outside of aircraft 2.

As discussed above, aircraft 2 may include a plurality of electrical busses. For instance, as shown in FIG. 2, aircraft 2 may include a respective propulsion bus for each ESS of ESSs 14. Each of the propulsion busses may be formed from various electrical cables and distribution panels. For instance, a first propulsion bus may be formed from cables and panels used to provide electrical energy to electric motors of outboard nacelles 8A and 8D, and a second propulsion bus may be formed from cables and panels used to provide electrical energy to electric motors of inboard nacelles 8B and 8C. As shown in FIG. 2, the first propulsion bus may include: electrical cables 42A connecting ESS 14A to distribution panel 22A, electrical cables 44B connecting distribution panel 22A to EPU 13B (e.g., to the electric motor of inboard nacelle 8B), and electrical cables 44C connecting distribution panel 22A to EPU 13C (e.g., to the electric motor of inboard nacelle 8C). Similarly, the second propulsion bus may include: electrical cables 42B connecting ESS 14B to distribution panel 22B, electrical cables 44A connecting distribution panel 22B to EPU 13A (e.g., to the electric motor of outboard nacelle 8A), and electrical cables 44D connecting distribution panel 22B to EPU 13D (e.g., to the electric motor of outboard nacelle 8D). Electric cables 44A-44D (collectively, "electric cables 44") and electric cables 42A and 42B (collectively, "electric cables 42") may be any type of electrical cable, such as stranded, solid, and the like. As shown in FIG. 2, electric cables 42 and 44 may be routed through wings 6A and 6B.

Aircraft 2 may include one or more electric busses in addition to the propulsion busses. For instance, aircraft 2 may include one or more low voltage DC busses (e.g., 28 volts) that supply electrical energy to components of aircraft 2 other than propulsion motors (e.g., other than electrical motors 12). Some examples of components that may be powered via the low voltage DC busses include avionics and hotel loads (e.g., cabin lighting, cabin climate control, cooking, and the like). As shown in FIG. 2, aircraft 2 may include two non-propulsion electrical busses. Each of the non-propulsion electrical busses may include a battery, a distribution panel, and a control switch. For instance, a first non-propulsion electrical bus may include battery 38A, panel 36A, and control switch 26A. Similarly, a second non-propulsion electrical bus may include battery 38B, panel 36B, and control switch 26B. Panels 36A and 36B and batteries 38A and 38B may be included in nacelles. As shown in FIG. 2, panel 36A and battery 38A may be located in inboard nacelle 8B, and panel 36B and battery 38B may be located in inboard nacelle 8C. Control switches 26A and 26B may be located in fuselage 4 (e.g., in the cockpit). Activation of control switches 26 may result in activation (e.g., powering up) of the non-propulsion electrical busses, which may result in activation of the propulsion electrical busses. For instance, as shown in FIG. 2, ESS 14A may receive power from panel 36A and ESS 14B may receive power from panel 36B.

As shown in FIG. 2, inboard nacelles 8B and 8C may respectively include landing gear 40A and 40B. The presence of landing gear 40A and 40B in inboard nacelles 8B and 8C may reduce the space available for other components.

In some examples, aircraft 2 may be a purely electrically powered aircraft. For instance, EPUs 13 may be entirely powered using electrical energy provided by ESSs 14. In other examples, aircraft 2 may be a hybrid-electric aircraft. For instance, aircraft 2 may include a combustion operated motor connected to a generator (e.g., a genset) that generates electrical energy for immediate use by EPUs 13 or for storage in ESSs 14.

Aircraft 2 may include a respective charging panel for each of the propulsion busses. For instance, as shown in FIG. 2, aircraft 2 may include charging panel 24A for the first propulsion bus and charging panel 24B for the second propulsion bus. Each of the charging panels may include components configured to enable the charging of an ESS of ESSs 14 using power sourced from outside of aircraft 2, such as ground power.

Figure 3A:
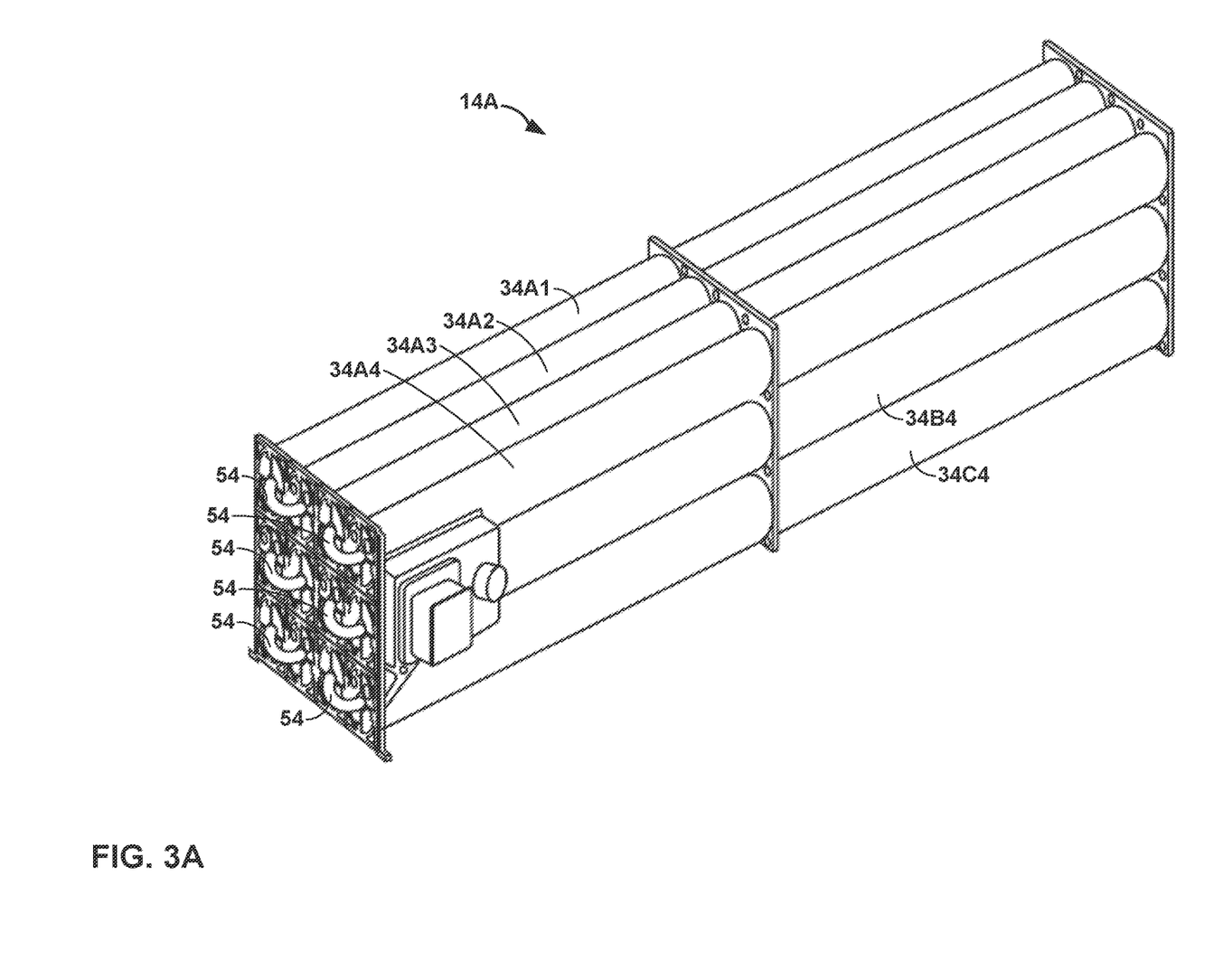
FIGS. 3A and 3B are schematic diagrams illustrating views of an ESS that includes a plurality of battery modules, in accordance with one or more aspects of this disclosure.
Figure 3B:
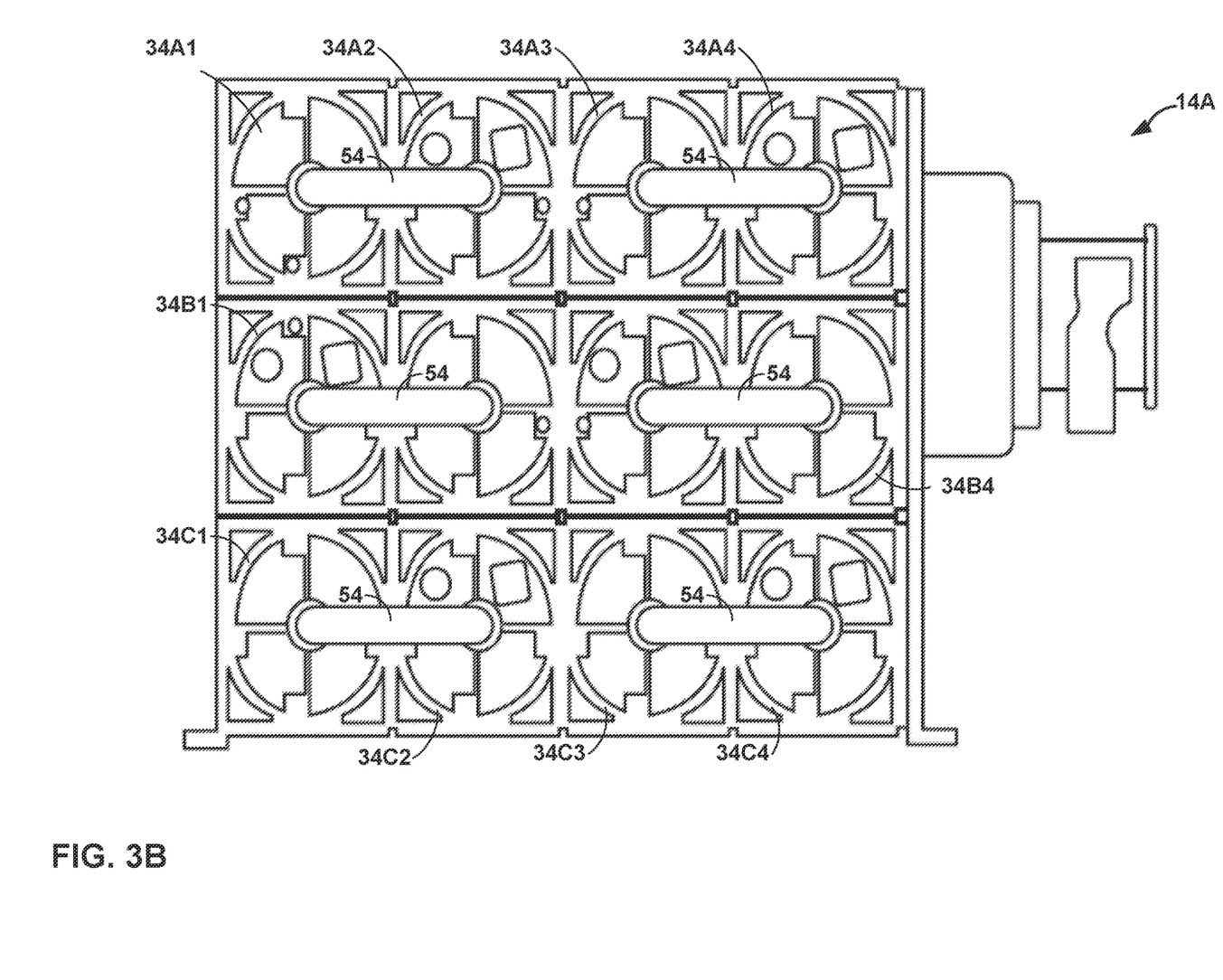

FIGS. 3A and 3B are schematic diagrams illustrating views of an ESS that includes a plurality of battery modules, in accordance with one or more aspects of this disclosure. As shown in FIGS. 3A and 3B, ESS 14A may include battery modules 34A1-34C4 (collectively, "battery modules 34A"). Battery modules 34A may be arranged in a two-dimensional structure. For instance, as shown in FIGS. 3A and 3B, battery modules 34A may be arranged in a four wide by three tall structure. Such an arrangement may be undesirable for cars where the battery modules are located in a floor of the car.

While FIGS. 3A and 3B illustrate ESS 14A, it is understood that ESS 14B may include a similar arrangement of battery modules. For instance, ESS 14B may include a two-dimensional arrangement of battery modules.

As discussed above, battery modules may include one or more battery packs. For instance, each of battery modules 34A may include one or more battery packs. Each of the battery packs may include one or more battery cells. In some examples, battery cells of a battery pack may be in parallel with each other. For instance, where a battery pack includes N (e.g., 2, 3, 4, 5, 6, 7, etc.) cells, the N cells may be electrically in parallel. As one specific example, a battery pack may include five cells that are electrically in parallel (e.g., 5P). Battery packs may be electrically connected in series. For instance, where each battery pack includes N cells and a battery module include M battery packs, the battery module may be in a NPMS arrangement.

Figure 4:
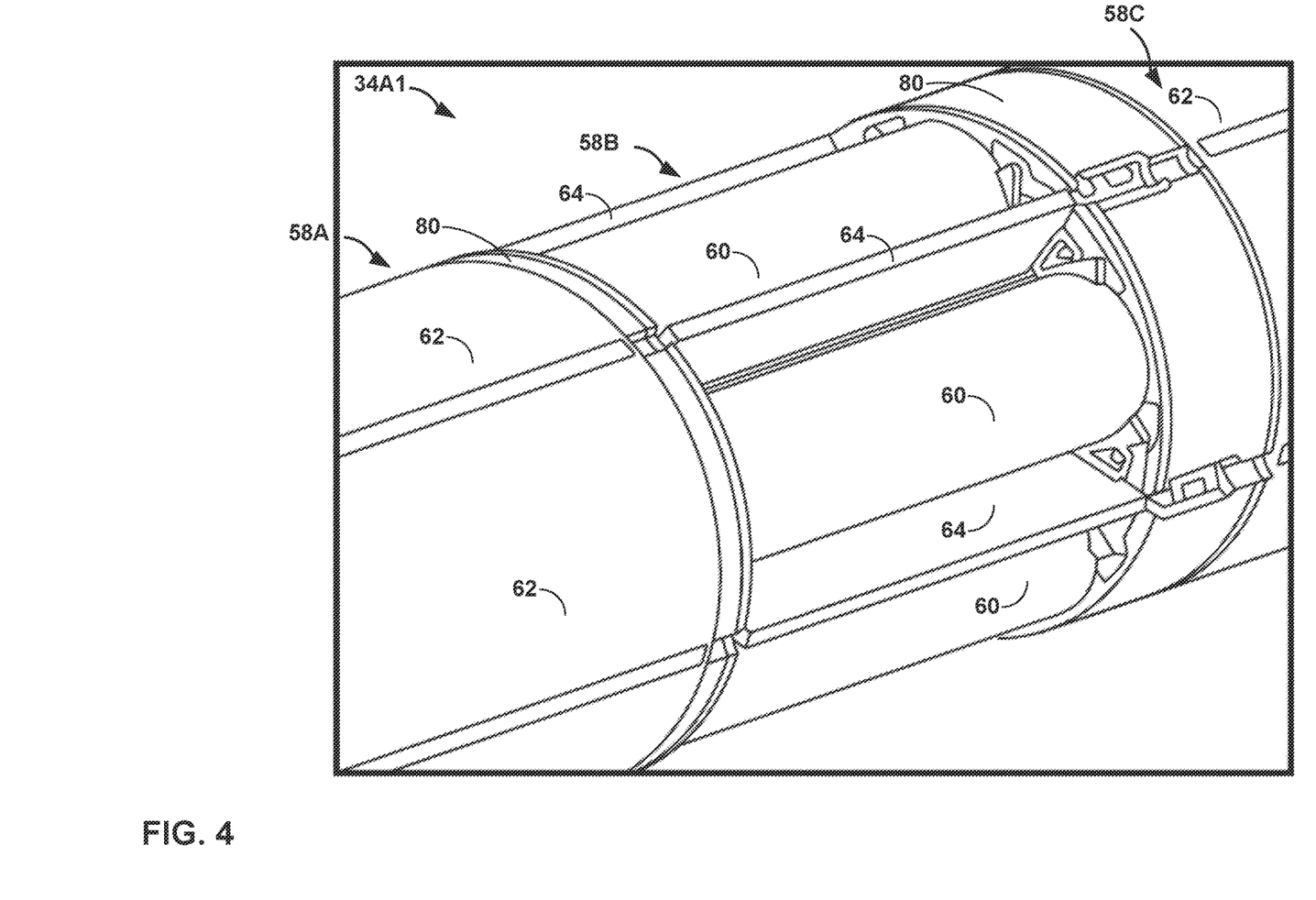
FIG. 4 is a schematic diagram illustrating a cutaway view of a battery module that includes a plurality of battery packs, in accordance with one or more aspects of this disclosure.

FIG. 4 is a schematic diagram illustrating a cutaway view of a battery module that includes a plurality of battery packs, in accordance with one or more aspects of this disclosure. As shown in FIG. 4, battery module 34A1 may include battery packs 50A-50C (collectively, "battery packs 58"). Each of battery packs 58 may include battery cells 60, fire resistant material 62 and/or 64. Fire resistant material 62 is shown as being removed from battery pack 58B to illustrate components within battery pack 58B. Other battery packs (e.g., battery packs 58A and 58C) may include components similar to battery pack 58B. As discussed above, battery cells 60 may be any suitable chemistry, such as lithium ion.

Fire resistant materials 62 and 64 may provide various fire resistance to battery packs 58. As one example, fire resistant material 62 may be a fire suppressant foam (e.g., polyurethane foam) configured to resist propagation of fire/high temperatures from battery cells to outside battery module 34A1. As another example, fire resistant material 64 may be a fire-resistant paper configured to provide both electrical and thermal isolation (e.g., up to 1430 degrees C.). As shown in FIG. 4, fire resistant material 64 may be disposed between each of battery cells 64.

Battery packs 58 may be separated by firewalls. For instance, as shown in FIG. 4, battery packs 58 may be separated from each other by firewalls 80. Firewalls 80 may include components configured to prevent propagation of fire between adjacent battery packs. Firewalls 80 may include bus bars. For instance, each of firewalls 80 may include a bus bar connected to terminals of battery calls 60. As such, each battery pack of battery packs 58 may include a first bus bar connected to first terminals of each of the plurality of battery cells of the battery pack; and a second bus bar connected to second terminals of each of the plurality of battery cells of the battery pack such that the plurality of battery cells are electrically in parallel.

While not shown in FIG. 4 and as discussed in further detail below, battery module 34A1 may include a pressure vessel. For instance, battery module 34A1 may include a pressure vessel that may surround battery packs 58.

Figure 5:
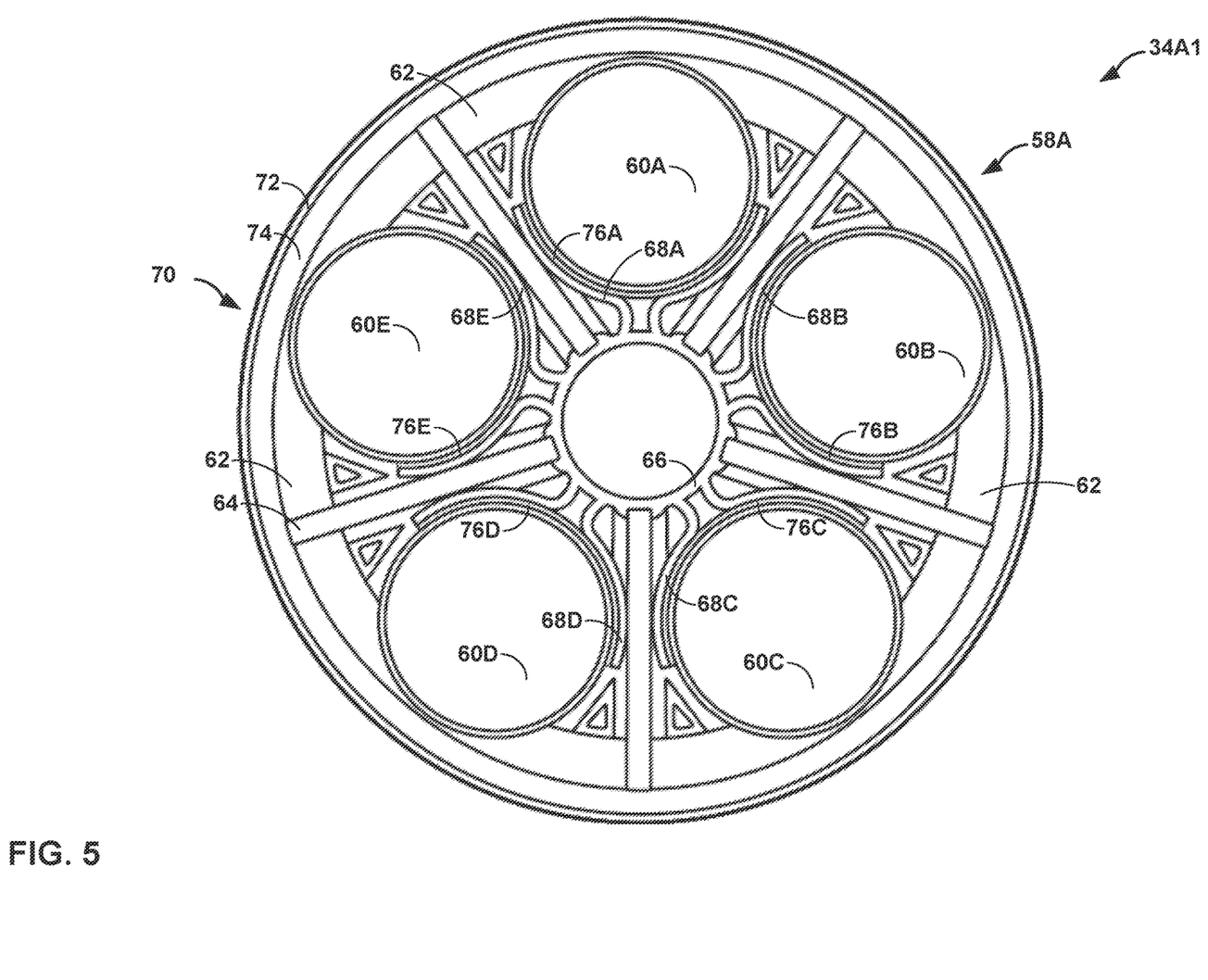
FIG. 5 is a schematic diagram illustrating a cross section of a battery module, in accordance with one or more aspects of this disclosure.

FIG. 5 is a schematic diagram illustrating a cross section of a battery module, in accordance with one or more aspects of this disclosure. FIG. 5 may be a cross section of battery module 34A1. As shown in FIG. 5, battery module 34A1 may include battery pack 58A, cooling channel 66, and pressure vessel 70. Battery pack 58A may include battery cells 60A-60E (collectively, "battery cells 60"), fire resistant materials 62 and 64. As noted above, each battery pack may include similar components.

Pressure vessel 70 may surround the battery cells and provide containment (e.g., during a period of sustained thermal runaway as the battery cells out-gas). In some designs, pressure vessel 70 may be a significant weight contributor. Most ESS designs utilize a box-like configuration, where the corners and edges of pressure vessel 70 may require additional material to handle the internal pressure.

In accordance with one or more aspects of this disclosure, pressure vessel 70 may be a cylindrical pressure vessel. By using a cylindrical shape, a pressure load may be more evenly distributed, thus minimizing a required material thickness of pressure vessel 70. Not only does this strategy allow for thinner materials to be used to form pressure vessel 70, but also lighter and cheaper materials, such as polycarbonate, as an example.

Pressure vessel 70 may be formed of exterior skin 72 and/or interior skin 74. Exterior skin 72 may be formed of polycarbonate or other suitable material. As such, pressure vessel 70 may be at least partially formed from polycarbonate. Interior skin 74 may be formed of phenolic cork or other suitable material.

Cooling channel 66 may be configured to carry a coolant fluid to exchange heat with battery cells 60. Cooling channel 66 may extend axially through battery module 34A1. For instance, cooling channel 66 may extend through a plurality of battery packs of battery module 34A1. As such, a single cooling channel may exchange heat with battery cells of multiple battery packs.

Cooling channel 66 may include features configured to support battery cells 60. For instance, cooling channel 66 may include pedestals 68A-68E (collectively, "pedestals 68"). Each of pedestals 68 may be mated to a respective battery cell of battery cells 60. For instance, as shown in FIG. 5, pedestal 68A may be mated to battery cell 60A, pedestal 68B may be mated to battery cell 60B, . . . , and pedestal 68E may be mated to battery cell 60E.

Cooling channel 66 may be formed via any suitable process and material. In some examples, cooling channel 66 may be extruded and/or may be formed of magnesium. In operation, coolant fluid may flow through a fluidic path of cooling channel 66. In some examples, the surface of cooling channel 66 that forms the fluidic path may be modified to disturb a fluid boundary layer (e.g., may be rifled, splined, etc.). In this way, heat exchange efficiency may be improved.

In some examples, one or both ends of cooling channel 66 may be threaded or otherwise configured to receive an axial retention component. Such an axial retention component may be attached to cooling channel 66 to provide axial force to act as a "tie-bolt" and restrain battery packs 58.

During operation, due to various reasons, one or more of battery cells 60 may overheat. If left unchecked, an overheating battery cell of battery cells 60 may cause other battery cells of battery cells 60 to overheat. Such an event may be referred to as thermal runaway, which may be undesirable.

In accordance with one or more aspects of this disclosure, battery cells 60 may be mated to cooling channel 66 (e.g., pedestals 68 of cooling channel 66) via a thermally conductive component of thermally conductive components 76A-76E (collectively, "thermally conductive components 76"). Thermally conductive components 76 may be formed of a material such that, during normal operation, thermally conductive components 76 conduct heat between battery cells 60 and cooling channel 66. However, the material may have a melting point that is lower than a thermal runaway temperature of battery cells 60.

When a thermally conductive component melts, the melted thermally conductive component may flow away from the connection between battery cell and cooling channel, substantially reducing the amount of heat conducted between battery cell and cooling channel. For instance, battery module 34A1 may include one or more cavities configured to, where a particular thermally conductive component melts, receive the melted thermally conductive component. As such, when a particular battery cell of battery cells 60 overheats, a thermally conductive component connecting the particular battery cell to cooling channel 66 may melt before the particular battery cell can transmit enough heat to cause another battery cell to overheat. For instance, where battery cell 60A overheats, thermally conductive component 76A may melt before heat from battery cell 60A causes battery cell 60A or 60B to overheat (e.g., act as a thermal fuse). In this way, aspects of this disclosure may reduce a probability of thermal runaway.

While described with reference to battery module 34A1, it is understood that each battery module of battery modules 34 may include a respective cooling channel. In some examples, cooling channels of multiple battery modules may be linked to form a single coolant loop. For instance, as shown in FIGS. 3A and 3B, ESS 14A may include connectors 54 that fluidically couple cooling channels of different battery modules 34. As such, in some examples, a first battery module of battery modules 34 may include a fluid inlet port that receives coolant fluid from a pump/radiator and a last battery module of battery modules 34 may include a fluid output port that provides coolant fluid to the pump/radiator. In between the fluid inlet port and the fluid outlet port, the coolant fluid may pass through cooling channels of each of battery modules 34 (e.g., via connectors 54 between cooling channels).

While described above as being fluidically in series, cooling channels of battery modules 34 are not so limited. For instance, the cooling channels of battery modules 34 may be fluidically connected in parallel, or may be broken down in a series/parallel arrangement.

As discussed above, the circular configuration of battery cells described herein may be advantageous for aircraft. For instance, by having the battery cells radially distributed about the cooling channel, a weight efficiency of an ESS may be improved. As one specific example, the weight efficiency of the ESS may be improved such that a ratio of a weight of the plurality of battery cells to a weight of the battery module is greater than or equal to 0.6.

Figure 6:
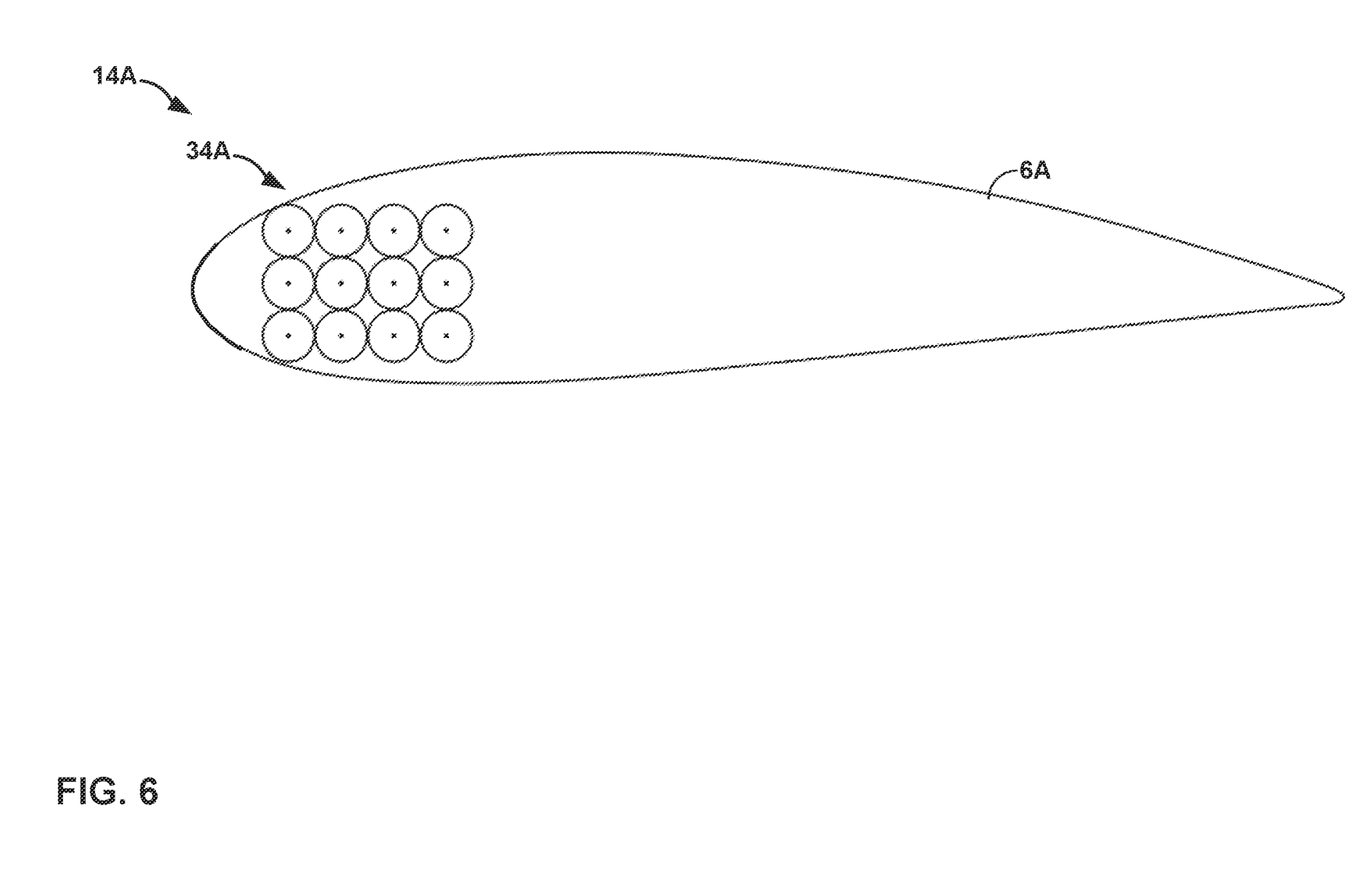
FIG. 6 is a schematic diagram illustrating a cross section of a wing that includes a plurality of battery modules, in accordance with one or more aspects of this disclosure.

FIG. 6 is a schematic diagram illustrating a cross section of a wing that includes a plurality of battery modules, in accordance with one or more aspects of this disclosure. As shown in FIG. 6, battery modules 34A of ESS 14A may be located in a forward quarter chord of wing 6A. Battery modules 34A may be oriented in wing 6A such that a longitudinal axis of the plurality of battery modules (e.g., an axis parallel to the cooling channels) is substantially parallel to a leading edge of the wing.

The following examples may illustrate one or more aspects of the disclosure:

Example 1. A system comprising: one or more battery modules, a battery module of the one or more battery modules comprising: a cylindrical pressure vessel; a cooling channel extending axially through the cylindrical pressure vessel; and one or more battery packs within the cylindrical pressure vessel, a battery pack of the one or more battery packs comprising a plurality of battery cells radially distributed about the cooling channel.

Example 2. The system of example 1, wherein the cooling channel further comprises: a plurality of pedestals, each respective pedestal of the plurality of pedestals mated to a respective battery cell of the plurality of battery cells via a respective thermally conductive component of a plurality of thermally conductive components.

Example 3. The system of example 2, wherein the plurality of thermally conductive components are formed of a material having a melting point that is lower than a thermal runaway temperature of the plurality of battery cells, the battery modules further comprising: one or more cavities configured to, where a particular thermally conductive component melts, receive the melted thermally conductive component.

Example 4. The system of any of examples 1-3, wherein the battery pack further comprises: a first bus bar connected to first terminals of each of the plurality of battery cells; and a second bus bar connected to second terminals of each of the plurality of battery cells such that the plurality of battery cells are electrically in parallel.

Example 5. The system of any of examples 1-4, wherein the battery pack further comprises fire resistant material disposed between each of the plurality of battery cells.

Example 6. The system of any of examples 1-5, wherein the one or more battery packs comprises a plurality of battery packs, each respective battery pack of the plurality of battery packs comprising a respective plurality of battery cells radially distributed about the cooling channel.

Example 7. The system of example 6, wherein battery cells of each battery pack are electrically connected in parallel, and wherein the plurality of battery packs are connected in series.

Example 8. The system of any of examples 1-7, wherein the one or more battery modules comprises a plurality of battery modules arranged in a two-dimensional structure.

Example 9. The system of example 8, wherein the plurality of battery modules are located in a wing of an aircraft.

Example 10. The system of example 9, wherein the plurality of battery modules are located in a forward quarter chord of the wing.

Example 11. The system of any of examples 8-10, wherein a longitudinal axis of the plurality of battery modules is substantially parallel to a leading edge of the wing.

Example 12. The system of any of examples 9-11, further comprising: an electric motor coupled to a propulsor configured to propel the aircraft using electrical energy sourced from the one or more battery modules.

Example 13. The system of examples 8-12, wherein each respective battery module of the plurality of battery modules comprises a respective cooling channel of a plurality of cooling channels, the system further comprising: one or more pumps configured to circulate coolant fluid through the plurality of cooling channels.

Example 14. The system of examples 8-13, wherein each respective battery module of the plurality of battery modules comprises a respective cooling channel of a plurality of cooling channels, the system further comprising: one or more connectors configured to fluidically connect cooling channels of a pair of battery modules of the plurality of battery modules.

Example 15. The system of any of examples 1-14, wherein each of the plurality of battery cells comprises a lithium-ion battery cell.

Example 16. The system of any of examples 1-15, wherein the plurality of battery cells comprises five battery cells.

Example 17. The system of any of examples 1-16, wherein a ratio of a weight of the plurality of battery cells to a weight of the battery module is greater than or equal to 0.6.

Example 18. The system of any of examples 1-17, wherein the cylindrical pressure vessel is at least partially formed from polycarbonate.

Various examples have been described. These and other examples are within the scope of the following claims.

What is claimed is:

1. A system comprising:
   one or more battery modules, a battery module of the one or more battery modules comprising:
   a cylindrical pressure vessel;
   a cooling channel extending axially through the cylindrical pressure vessel; and
   one or more battery packs within the cylindrical pressure vessel, a battery pack of the one or more battery packs comprising a plurality of battery cells radially distributed about the cooling channel.

2. The system of claim 1, wherein the cooling channel further comprises:
   a plurality of pedestals, each respective pedestal of the plurality of pedestals mated to a respective battery cell of the plurality of battery cells via a respective thermally conductive component of a plurality of thermally conductive components.

3. The system of claim 2, wherein the plurality of thermally conductive components are formed of a material having a melting point that is lower than a thermal runaway temperature of the plurality of battery cells, the battery modules further comprising:
   one or more cavities configured to, where a particular thermally conductive component melts, receive the melted thermally conductive component.

4. The system of claim 1, wherein the battery pack further comprises:
   a first bus bar connected to first terminals of each of the plurality of battery cells; and
   a second bus bar connected to second terminals of each of the plurality of battery cells such that the plurality of battery cells are electrically in parallel.

5. The system of claim 1, wherein the battery pack further comprises fire resistant material disposed between each of the plurality of battery cells.

6. The system of claim 1, wherein the one or more battery packs comprises a plurality of battery packs, each respective battery pack of the plurality of battery packs comprising a respective plurality of battery cells radially distributed about the cooling channel.

7. The system of claim 6, wherein battery cells of each battery pack are electrically connected in parallel, and wherein the plurality of battery packs are connected in series.

8. The system of claim 1, wherein the one or more battery modules comprises a plurality of battery modules arranged in a two-dimensional structure.

9. The system of claim 8, wherein the plurality of battery modules are located in a wing of an aircraft.

10. The system of claim 9, wherein the plurality of battery modules are located in a forward quarter chord of the wing.

11. The system of claim 8, wherein a longitudinal axis of the plurality of battery modules is substantially parallel to a leading edge of the wing.

12. The system of claim 9, further comprising:
an electric motor coupled to a propulsor configured to propel the aircraft using electrical energy sourced from the one or more battery modules.

13. The system of claim 8, wherein each respective battery module of the plurality of battery modules comprises a respective cooling channel of a plurality of cooling channels, the system further comprising:
one or more pumps configured to circulate coolant fluid through the plurality of cooling channels.

14. The system of claim 8, wherein each respective battery module of the plurality of battery modules comprises a respective cooling channel of a plurality of cooling channels, the system further comprising:
one or more connectors configured to fluidically connect cooling channels of a pair of battery modules of the plurality of battery modules.

15. The system of claim 1, wherein each of the plurality of battery cells comprises a lithium-ion battery cell.

16. The system of claim 1, wherein the plurality of battery cells comprises five battery cells.

17. The system of claim 1, wherein a ratio of a weight of the plurality of battery cells to a weight of the battery module is greater than or equal to 0.6.

18. The system of claim 1, wherein the cylindrical pressure vessel is at least partially formed from polycarbonate.

19. An aircraft comprising:
a wing;
one or more battery modules positioned in the wing, a battery module of the one or more battery modules comprising:
a cylindrical pressure vessel;
a cooling channel extending axially through the cylindrical pressure vessel; and
one or more battery packs within the cylindrical pressure vessel, a battery pack of the one or more battery packs comprising a plurality of battery cells radially distributed about the cooling channel; and
an electric motor coupled to a propulsor configured to propel the aircraft using electrical energy sourced from the one or more battery modules.

* * * * *